United States Patent
Pullen et al.

(10) Patent No.: US 6,871,289 B2
(45) Date of Patent: Mar. 22, 2005

(54) SLEW RATE LIMITED REFERENCE FOR A BUCK CONVERTER

(75) Inventors: Stuart Pullen, Raleigh, NC (US); Terry J. Groom, Dallas, TX (US)

(73) Assignee: Arques Technology, Santa Clara, CA (US)

( * ) Notice: Subject to any disclaimer, the term of this patent is extended or adjusted under 35 U.S.C. 154(b) by 76 days.

(21) Appl. No.: 10/615,616

(22) Filed: Jul. 8, 2003

(65) Prior Publication Data

US 2005/0010826 A1 Jan. 13, 2005

(51) Int. Cl.[7] .............................. G06F 1/26; G05F 1/40; G05F 1/56
(52) U.S. Cl. ..................... 713/300; 323/224; 323/282; 323/283; 323/284; 323/285
(58) Field of Search ................. 323/282, 283, 323/284, 285, 224; 713/300

(56) References Cited

U.S. PATENT DOCUMENTS

| | | | | |
|---|---|---|---|---|
| 5,499,184 A | * | 3/1996 | Squibb | 363/100 |
| 6,366,068 B1 | * | 4/2002 | Morishita | 323/282 |
| 6,495,995 B2 | | 12/2002 | Groom et al. | 323/283 |
| 6,522,113 B1 | * | 2/2003 | Betten | 323/282 |
| 6,525,516 B2 | * | 2/2003 | Schultz et al. | 323/282 |
| 6,815,937 B2 | * | 11/2004 | Poon et al. | 323/282 |

* cited by examiner

Primary Examiner—Thuan Du
Assistant Examiner—James K. Trujillo
(74) Attorney, Agent, or Firm—Richard F. Frankeny; Winstead Sechrest & Minick P.C.

(57) ABSTRACT

A compensated reference voltage for the controller of a buck regulator corrects for offsets and controls the rate at which the output load current can change in response to a change in the reference setting output voltage level of the buck converter. A current source is coupled to a resistor that has one terminal connected to the ground potential of the output voltage. The voltage across this resistor generates a remote reference voltage. A feedback current is generated as a function of the difference between the remote reference voltage and the output voltage. The feedback current is time integrated to form the compensated reference, which is used to control the ON-time of the buck converter.

26 Claims, 6 Drawing Sheets

SLEW RATE LIMITED REFERENCE FOR A BUCK CONVERTER

TECHNICAL FIELD

The present invention relates in general to controllers for switching regulators and in particular to controllers that set a relatively constant ON-time for the switching devices in switching regulators.

BACKGROUND INFORMATION

In some applications a buck controller is used in the power supply for a central processing unit (CPU). Most modern CPU integrated circuits (ICs) use some form of voltage control to regulate power dissipation; the CPU's voltage is lowered to conserve power and increased when higher performance is desired. The CPU may signal the power supply controller by supplying a voltage identification (VID) setting indicating a desired power supply voltage. In a buck regulated power supply, the buck controllers must control the output voltage in response to a change in VID settings. Many buck controllers rely on a current limit to control the maximum output current in response to a new VID setting. Other buck controllers use a digital up/down counter to slew the reference voltage at a controlled rate to change the output in response to a new VID setting.

Buck controllers are required to limit the output current when the reference voltage changes, for example, at start-up when the reference voltage first comes up or in some instances during normal operation. During normal operation, a CPU controller may change a VID setting to modify the output voltage. The VID setting may change depending on the power supply requirements of the CPU. When the CPU is idle, the voltage may be lowered to conserve power. During intensive CPU use, it is desirable to have the full processor voltage as this yields the best performance.

The requirement at start-up is handled by "soft start". Two techniques are generally used for soft start. In one case, the slew rate of the reference voltage is limited after power is turned on with a soft start capacitor. In the second case, the soft start relies on the power supply controller's current limit. After start-up is complete, most converters rely on the power supply controller's current limit to control the output current during VID transitions. This may not be desirable because of the high currents that result every time a VID transition occurs.

The other problem with most CPU power supply controllers is the previously discussed passive droop. It is often desirable to correct for passive "droop" in the sensing voltage in these applications. Passive droop in the sensing voltage is caused by load current flowing in printed circuit board (PCB) trace resistance. If the sense voltage measuring the output voltage droops due to the flow of load current, then the output voltage will vary as the load current changes.

The feedback voltage (sensing voltage) for the power supply controller generally cannot be taken directly at the output close to the output filter capacitors because of stability concerns. The stability concerns are caused by the low equivalent series resistance (ESR) of the network of parallel ceramic capacitors used for the output filter. Therefore, feedback is generally taken a point "upstream" from the filter capacitors. Since load current flows through the PCB traces, any resistance resulting from sensing upstream results in a voltage drop. Since this resulting voltage drop is not inside the feedback loop, the controller cannot correct for these voltage drops. The output voltage droops as a fiction of load current creating a load regulation error. Sometimes this load regulation error is desirable, however, because the PCB trace resistance is unpredictable this may not be the best way to introduce intentional voltage droop. Passive droop may also result from a difference in ground potentials for different circuits. The ground potential for the bandgap reference in the power supply control chip is not necessarily at the same potential as the ground potential for the load. This is especially true in high current applications where the voltage drop in PCB traces may be significant. Therefore, to insure the best accuracy, the control loop should be able to correct for passive voltage droop. If a voltage droop is desired, then active circuits that do not suffer from the tolerance of the PCB trace resistance may be used to introduce it intentionally.

A typical constant ON-time controller for a buck regulator is shown in FIG. 5. The output voltage (Vout) 516 is set by the duty cycle which is defined as the ratio of ON-time of the high side field effect transistor (FET) 507 to the total switching time period. Whenever Vout 516 drops below the reference voltage Vref 517, comparator 508 sets latch 509. Gate drivers 519 turn ON FET 507 thereby charging inductor (L) 504 and delivering current to the load (not shown) coupled to Vout 516. Latch 509 remains set until the voltage 518 across capacitor (C) 511 exceeds Vref 517. Then, comparator 510 resets latch 509 and gate drivers 519 turn FET 507 OFF and FET 506 ON. The energy stored in L 504 causes the load current to continue to flow to Vout 516. Catch diode (D) 505 insures that the current in L 504 is not interrupted during switching to minimize transients.

The ON-time (time FET 507 is ON) is a function of both Vin 515 and Vref 517. As Vin 515 rises, the ON-time will be shorter since C 511 charges faster. If Vref 517 is increased, C 511 has to charge to a higher voltage to trip the comparator 510, also resulting in a longer ON-time. Thus, the circuitry adjusts the ON-time to minimize the frequency changes (as determined by the time between pulses) that would otherwise result from changes in Vin 515 and Vout 516. To increase the current in inductor (L) 504 in response to a step change in the load (not shown) coupled to Vout 516, the control loop generates more ON pulses per unit time. To decrease the current in L 504, the control loop generates fewer pulses per unit time. Therefore, during transient load steps the frequency is not constant.

FIG. 1 is a schematic of a buck converter system 100 according to the prior art. A controller 110 receives Vout 120 and Vref 123 and generates output 130 for controlling gate drivers 109. Gate drivers 109 control the ON and OFF times of FET 106 and FET 107. Gate drivers 109 turn ON FET 107 thereby charging L 104 and delivering current to the load (not shown) coupled to Vout 120. Correspondingly, gate drivers 109 turn OFF FET 107 and turn ON FET 106 in response to output 130 of controller 110. The energy stored in L 104 causes the current to continue to flow to Vout 120 when FET 107 turns OFF and FET 106 turns ON. Catch diode D 105 insures current in L 104 is not interrupted to minimize transients during switching. Resistor (R) 103 represents resistance between L 104 and a load (not shown) coupled to Vout 120. Resistance 102 represents the equivalent series resistance (ESR) of capacitor C 101.

FIG. 1 shows a buck converter system 100 that uses an oscillator 111, an up/down counter 112, a digital to analog converter (DAC) 113, and a comparator 114, to control the output current during start up and during changes in the VID inputs 126. The bandgap reference 119 is amplified ((R 117+R 118)/R117) to the desired voltage by the noninverting operational amplifier (OPA) 118. Reference DAC 115 may be a simple resistor divider with multiple taps. The VID inputs 126 determine which tap is used to generate Vref 121. At power up Vref 121 may rise quickly. Comparator 114 switches if Vout 120 is lower than Vref 121, and its output 122 then transitions to a logic one signaling a count-up command to the up/down counter 112. Up/down counter 112 counts each edge of the oscillator clock (OSC) 111. Thus, DAC 113 inputs increment up from zero in small increments providing slew rate limiting and preventing output current overshoot. The slew rate is determined by the step size of DAC 113 and the frequency of OSC 111. System 100 handles changes in the VID 126 setting. If the change in the VID inputs 126 requires a lower output voltage (Vref 121 is lower than Vout 120), then comparator 114 will transition to a logic zero signaling a countdown command to the up/down counter 112. In this case, Vout 120 will be stepped down slowly preventing output current under shoot.

The prior art system in FIG. 1 does not correct for DC errors between the ground potential of the reference DAC 115 (e.g., low side of R2 117) and the ground potential of Vout 120 (negative terminal of C1 101). One way to solve this problem is to tie the ground for reference DAC 115 directly to the negative side of C1 101. This forces the two ground potentials to be equal. However, it is not always possible to locate the bandgap reference 119 and reference DAC 115 close to Vout 120. Therefore, there is a need to generate a remote reference that may not be referenced to the same ground as Vout 120 when providing a VD programming function. If a remote reference is used, there is also a need to compensate for any DC offset that may result. There is also a need for providing slew rate limiting of the remote reference so that the output current does not overshoot or undershoot while programming Vout 120 and without having the need for a counter 112, DAC 113 and oscillator 111. There is, therefore, a need for circuitry to generate a compensated reference voltage to control the slew rate of the output current of a buck converter power supply in response to load changes and to changes in the regulated output voltage due to VID programming. There is also a need to have the compensated reference voltage reduce offset errors due to current flow in PCB traces.

SUMMARY OF THE INVENTION

A compensated reference voltage is used to control a buck converter and limit the rate of change in the output current and correct for offsets due to voltage drops in ground traces. The compensated reference is used when controlling the ON-time of the buck converter that receives a regulator input voltage and generates a regulated output voltage for powering a load referenced to a first ground potential. A difference circuit generates an amplified difference between a remote reference voltage and the regulated output of the buck converter. The amplified difference between the remote reference voltage and the regulated output of the buck converter is further constrained or limited between a maximum positive and a minimum negative value generating a limit voltage. This limit voltage is time integrated to generate the compensated reference voltage. By setting the time constant of the integrating circuit, the slew rate of the compensated reference voltage is controlled, thus determining how fast the buck regulator responds to changes in load or changes in the remote reference voltage.

In one embodiment of the present invention, the remote reference is generated by amplifying a fixed reference voltage (e.g., a bandgap reference) generated relative to a second ground potential. In this case, the remote reference is coupled directly to the difference circuit and the first and second ground potentials are equal. In another embodiment, where the first and second ground potential are equal, the amplified fixed reference is coupled as the reference input to a digital-to-analog-converter (DAC). The DAC generates a DAC output that is proportional to the amplified fixed reference in response to a plurality of digital input signals. In this embodiment, the DAC output is directly coupled to the difference circuit as the remote reference voltage. This allows the remote reference voltage to be programmed and thus change the regulated output voltage.

In another embodiment of the present invention, the first and second ground potentials are not equal. In this embodiment, circuitry is used to generate the remote reference voltage relative to the first ground potential from the amplified fixed reference voltage that is generated relative to the second ground potential. A voltage to current converter is used to convert the fixed reference voltage into a proportional reference current source with a positive compliance voltage. The reference current source is coupled a resistor that is connected to the first ground potential. The voltage across this resistor generates the remote reference voltage relative to the first ground potential. This corrects for offsets that may result from high currents flowing in printed circuit board (PCB) traces separating the first and second ground potentials. The compensated reference voltage controls the rate at which the regulated output changes, enabling a soft start function as well as controlling the slew rate of the regulated output when responding to changes in the remote reference voltage or to changes in the load current.

The foregoing has outlined rather broadly the features and technical advantages of the present invention in order that the detailed description of the invention that follows may be better understood. Additional features and advantages of the invention will be described hereinafter, which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
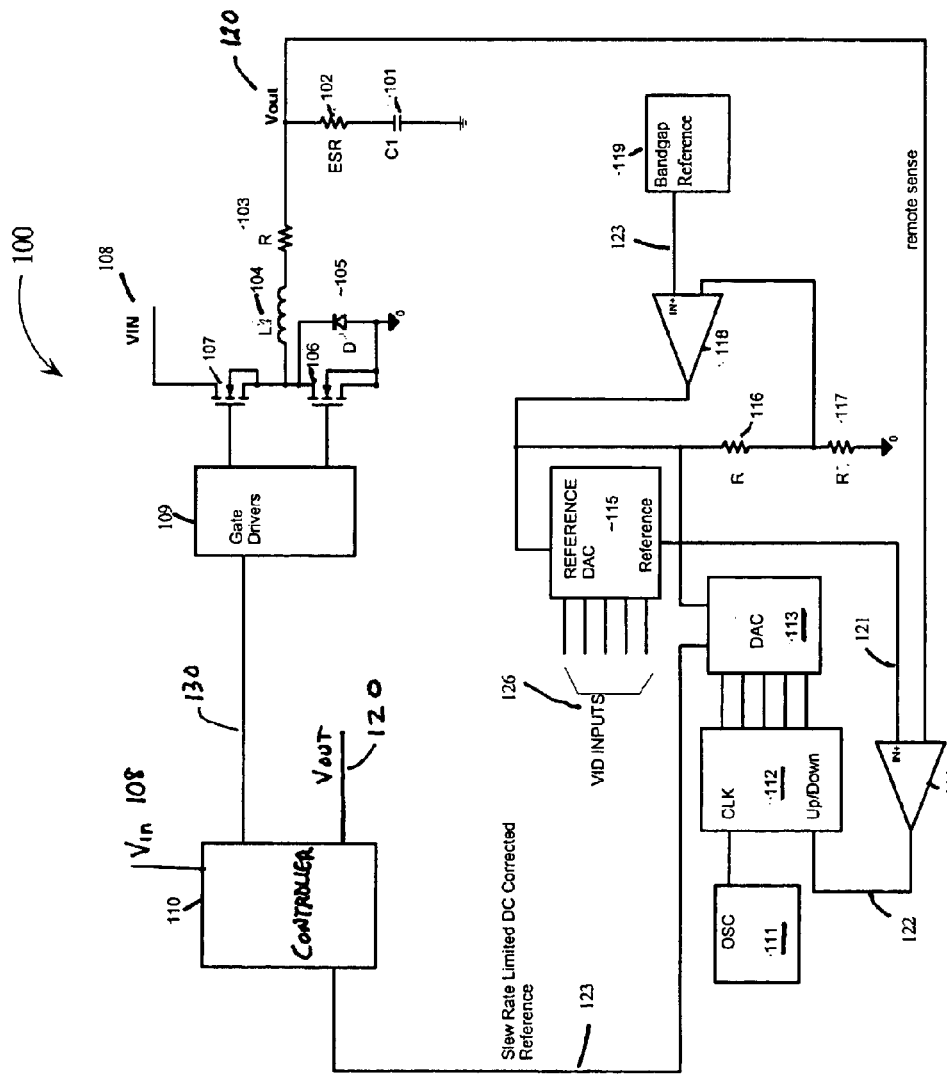
FIG. 1 is a circuit diagram of a prior art digital slew rate limited reference.

In the following description, numerous specific details are set forth to provide a thorough understanding of the present invention. However, it will be obvious to those skilled in the art that the present invention may be practiced without such specific details. In other instances, well-known circuits may be shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views. The term "buck converter" is used herein to describe the broad class of DC-to-DC converters that have a regulator input voltage that is higher that their regulator output voltage. There are a variety of controllers for this type of converter where a reference voltage is used to compare against the regulated output voltage to control the ON-time of the converter. Some buck converter topologies use a clock and some use self clocking and generate a pseudo constant ON-time. The terms "compensated" or "virtual reference" are used to describe a reference voltage that controls an ON-time that is not a precise fixed value but has a value that is determined by feedback. This ON-time is such that it keeps the difference between a precise voltage reference and the regulated output to a minimum value.

Figure 2:
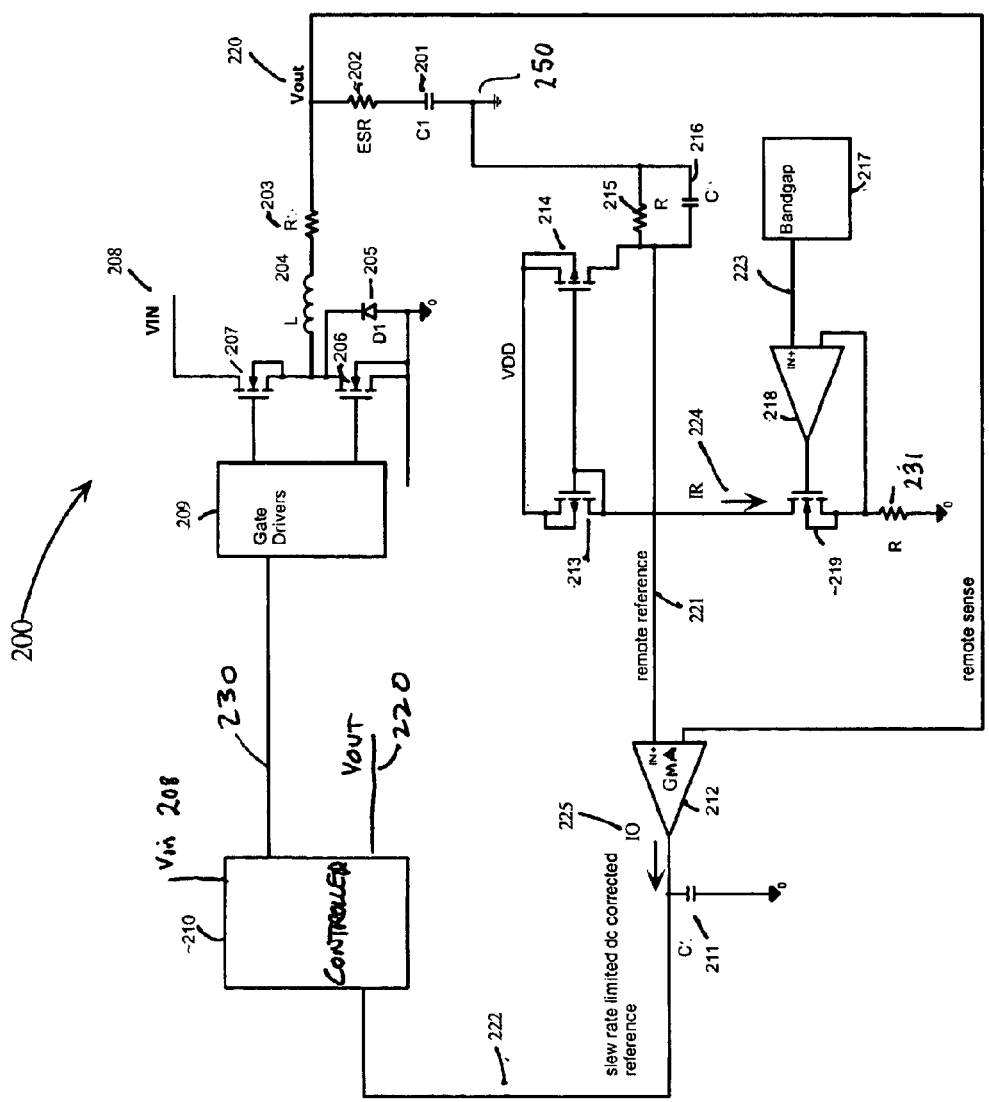
FIG. 2 is a circuit diagram of an analog slew rate limited DC compensated reference according to embodiments of the present invention.

FIG. 2 is a schematic of a circuit 200 for controlling a buck converter according to embodiments of the present invention. Output 230 of controller 210 is coupled to gate drivers 209 and determines when gate drivers 209 turn ON and OFF FETs 206 and 207. Gate drivers 209 turns ON FET 207 and OFF FET 206 while charging L 204 and delivering current to the load (not shown) coupled to Vout 220. Correspondingly, gate drivers 209 turn OFF FET 207 and ON FET 206 in response to output 230 of controller 210, and energy stored in L 104 causes the current to continue to flow to Vout 220. Catch diode D 205 insures that the current in L 204 is not interrupted during switching thus minimizing transients. Resistor R 203 represents resistance between L 204 and a load (not shown) coupled to Vout 220. Resistor ESR 202 represents the equivalent series resistance (ESR) of capacitor C 201. Controller 210 may or may not use a clock signal (not shown) for timing depending on its circuit topology.

Transconductance amplifier (GMA) 212 and capacitor 211, in the circuit of FIG. 2, perform the function of DAC 113, reference DAC 115, up/down counter 112, and comparator 114 in the circuit of FIG. 1. Additional flexibility is added with the P-channel FET (PFET) current mirrors 213 and 214. The circuit comprising OPA 218, FET 219 and resistor R 231 impresses the bandgap voltage (VBG) 223 across resistor R 231. FET 213 and FET 214 mirror the resulting current IR 224 (VGB 223/R 231) into the ground-referenced resistor R 215. The voltage across R 215 becomes remote reference voltage (VRR) 221. VRR 221 is derived from VBG 223 and is referenced relative to the output ground (low side of capacitor C 201). In this manner, circuit 200 removes any error due to differences in ground potential brought about by current flow in the PCB ground traces. Since IR 224 and hence the current mirrored to flow through R 215 are small currents, the resistance of the PCB ground trace coupling R 215 to ground 250 does not produce significant offset voltage. The only errors occur in the matching between FET 213 and FET 214.

VRR 221 is compared to the Vout 220 (remote sense) by GMA 212. A transconductance amplifier converts a voltage V (e.g., the difference between VRR 221 and Vout 220) to a corresponding current I (e.g., I 225) with a gain factor (transconductance Gm) such that current I is equal to V times Gm. Thus in circuit 200, (VRR 221–Vout 220) times Gm is equal to IO 225. Current IO 225 is integrated by capacitor C 211 and adjusts the voltage VS 222 across C 211. VS 222 reaches steady state when VRR 221 is substantially equal to Vout 220. The slew rate (time rate of voltage change across C 211) is controlled by the Gm of the GMA 212, and the value of the capacitor C 211. The time constant is the value of C 211 divided by Gm. Thus, circuit 200 corrects for any DC errors present in system 200. These errors include droop and offsets in the control circuitry 210. Circuit 200 also provides slew rate limiting at start-up and in response to a change in VBG 223.

Figure 3:
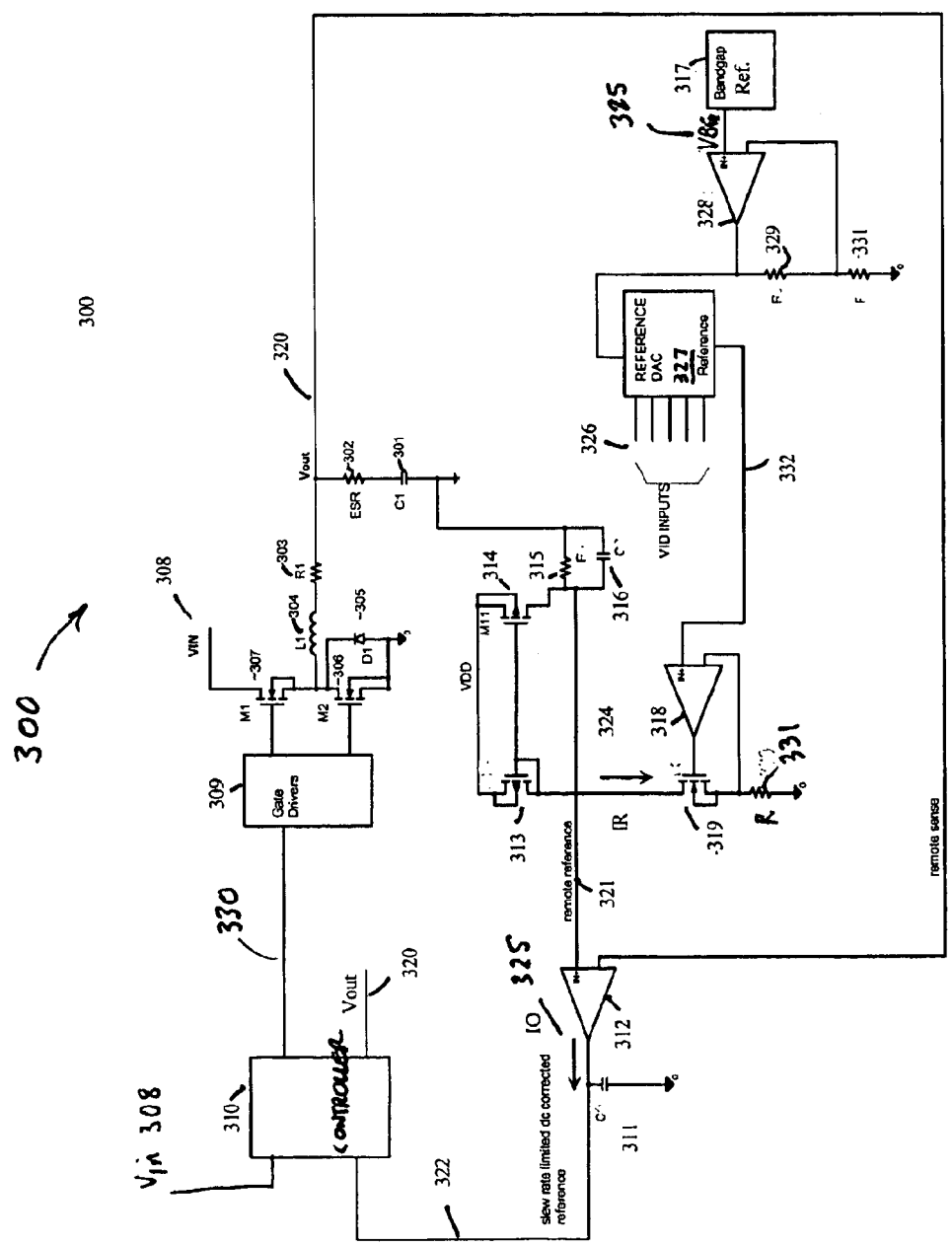
FIG. 3 is a circuit diagram of an analog slew rate limited DC compensated reference with a digital to analog converter (DAC) for programming the output of a buck converter according to embodiments of the present invention.

FIG. 3 is a schematic of a circuit 300 for controlling a buck converter according to another embodiment of the present invention. Output 330 of controller 310 is coupled to gate drivers 309 and determines when gate drivers 309 turn ON and OFF FETs 306 and 307. Gate drivers 309 turn ON FET 307 and OFF FET 306 while charging L 304 and delivering current to the load (not shown) coupled to Vout 320. Correspondingly, gate drivers 309 turn OFF FET 307 and ON FET 306 in response to output 330 of controller 310, and the energy stored in L 104 causes the current to continue to flow to Vout 320. Catch diode D 305 insures that the current in L 304 is not interrupted during switching to minimize transients. Resistor R 303 represents resistance between L 304 and a load (not shown) coupled to Vout 320. Resistor ESR 302 represents the equivalent series resistance (ESR) of capacitor C 301. Controller 310 may or may not use a clock signal (not shown) for timing depending on its circuit topology.

Circuit 300 is a modification of circuit 200 to enable control of Vout 320 in response to a VID setting determined by VID inputs 326. Circuit 300 adds OPA 328, R 329, R 331, and reference DAC 327 to bandgap reference 317. OPA 328 amplifies VBG 325 with a gain determined by the value of (R329+R 331)/R 331. The output of OPA 328 is coupled to reference DAC 327. Reference DAC 327 may be a simple resistor divider with many digitally selected taps. In this case, the VID inputs 326 determine which tap is used for the reference output voltage Vref 332. At power up, Vref 332 rises immediately with little delay. VRR 321 is compared to the Vout 320 (remote sense) by transconductance amplifier (GMA) 312. A transconductance amplifier converts a voltage V (e.g., the difference between VRR 321 and Vout 320) to a corresponding current I (e.g., I 325) with a gain factor (transconductance Gm) such that current I is equal to V times Gm. Thus in circuit 300, (VRR 321–Vout 320) times Gm is equal to I 325. Current I 325 is integrated by capacitor C 311 and adjusts the voltage VS 322 across C 311. VS 322 reaches steady state when VRR 321 is substantially equal to Vout 320. The slew rate (time rate of voltage change across C 311) is controlled by the Gm of the GMA 312, and the value of the capacitor C 311. The time constant is a value of C 311 divided by Gm. Thus, circuit 300 corrects for any DC errors present in the system 300. These errors include droop and offsets in the control circuitry 310. Circuit 300 also provides slew rate limiting at start-up and in response to a change in VBG 325.

The circuit comprising OPA 318, FET 319 and resistor R 331 impresses the bandgap voltage VBG 323 across R 331 thus setting current IR 324. FET 313 and FET 314 mirror IR 324 (VGB 323/R 331) into the ground-referenced resistor R 315. The voltage across R 315 becomes remote reference voltage (VRR) 321. VRR 321 is derived from VBG 323 and is referenced relative to the output ground (low side of capacitor C 301. In this manner the circuit 300 removes any error due to differences in ground potential brought about by current flow in the PCB ground traces. The slew rate is controlled by the Gm of the GMA 312, and the value of the capacitor C 311. The time constant is C 311/Gm.

For large VID changes and soft start, it is desirable to further limit the slew rate of the output current. To further limit the slew rate of the output current with changes in the VID setting, GMA 312 is designed to have current limiting. Current limiting means that the current output (IO 325) of GMA 312 will not increase above a maximum current Imax or decrease below a minimum current Imin. The value of Imax is a function of the bias current of GMA 312.

Figure 4:
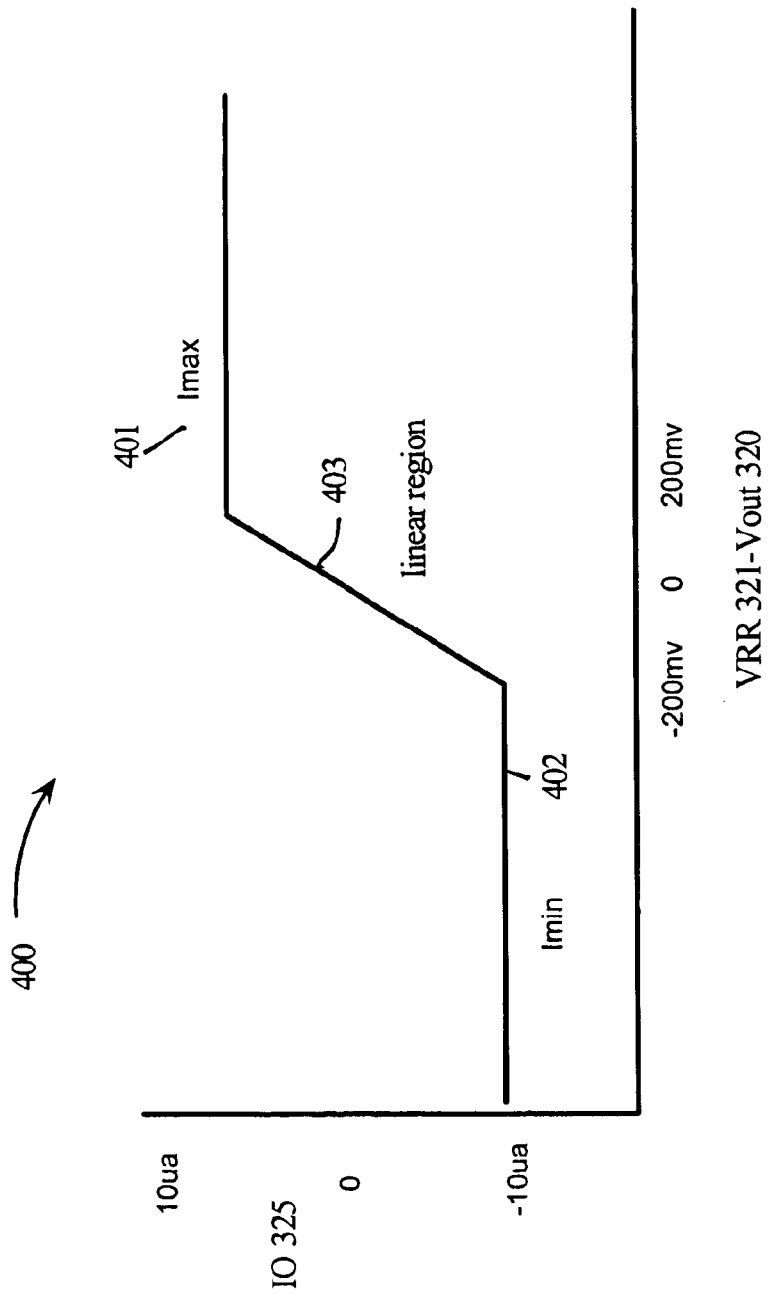
FIG. 4 is a circuit diagram of a transfer function of a voltage to current converter used in embodiments of the present invention.
Figure 5:
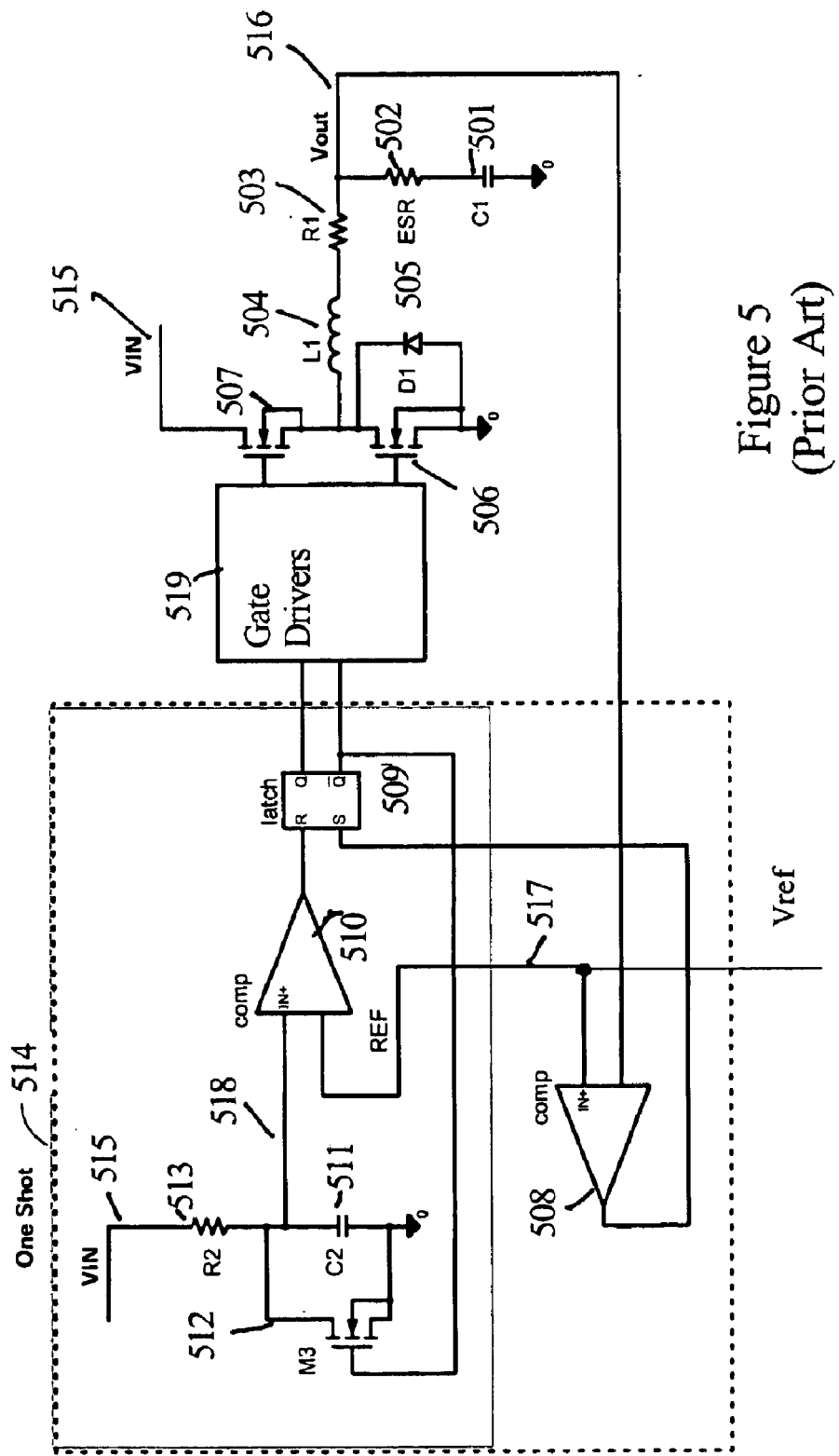
FIG. 5 is a circuit diagram of functions in a typical constant ON-time buck regulator.

FIG. 4 shows IO 325 as a function of the difference between VRR 321 and Vout 320. Note that IO 325 is clamped in both directions. This limits the slew rate of VS 322 to (Imax 401)/C10 in the positive direction and (Imin 402)/C10 in the negative direction.

Figure 6:
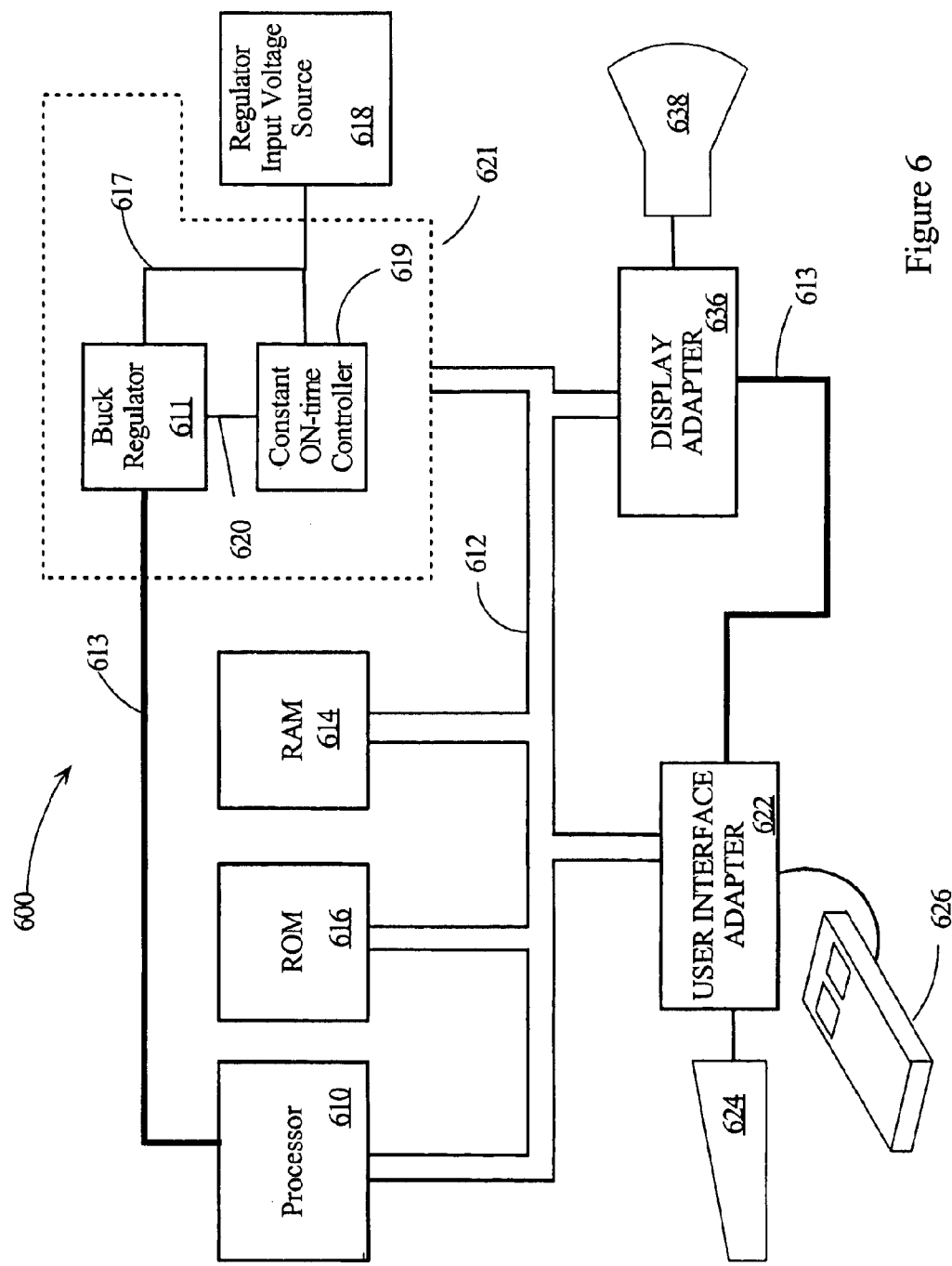
FIG. 6 is a representative hardware environment for practicing the present invention.

A representative hardware environment for practicing the present invention is depicted in FIG. 6, which illustrates a typical hardware configuration of a system in accordance with the subject invention having processing unit (processor) 610 and a number of other units interconnected via system bus 612. The system 600 shown in FIG. 6 includes random access memory (RAM) 614, read only memory (ROM) 616, user interface adapter 622 for connecting keyboard 624 and mouse 626 and/or other user interface devices such as a touch screen device (not shown) to bus 612, and display adapter 636 for connecting bus 612 to display device 638. A power supply system comprising buck regulator 611 and controller 619 receive unregulated voltage 617. Controller 619 generates a control signal 620 in response to a compensated reference voltage (e.g., reference VS 322 of FIG. 3) generated according to embodiments of the present invention. Control signal 620 is used to set the ON-time for buck regulator 611 for generating a regulated voltage on power bus 613 which delivers power to system components (e.g., processor 610). Controller 619 may receive VID inputs 326 on bus 612 for programming the regulated output voltage on power bus 613. Regulator input voltage source 618 may be provided from an alternating current source (AC) adapter, a battery or from a higher regulated voltage. Although the present invention and its advantages have been described in detail, it should be understood that various changes, substitutions and alterations can be made herein without departing from the spirit and scope of the invention as defined by the appended claims.

What is claimed is:

1. A power supply comprising:
    a buck regulator coupled to a regulator input voltage and generating a regulated output voltage for powering a load referenced to a first ground potential in response to an ON-time voltage pulse, wherein said ON-time voltage pulse has a first logic state when said regulated output voltage supplies energy to said load directly from said regulator input and a second logic state when said regulated output voltage is supplying energy stored from said regulator input voltage;
    a controller for generating said ON-time voltage pulse in response to said regulator input voltage, said regulated output voltage, and a compensated reference voltage;
    a reference circuit having a reference output generating a modified reference voltage relative to said first ground potential in response to a reference input voltage generated relative to a second ground potential; and
    compensated reference circuitry for generating said compensated reference voltage as a time integral of a difference between said modified reference voltage and said regulator output voltage multiplied times a gain factor.

2. The power supply of claim 1, wherein said first and second ground potentials are equal potentials.

3. The power supply of claim 2, wherein a pulse width of said ON-time voltage pulse is generated in response to comparing said compensated reference to said regulated output voltage.

4. The power supply of claim 2, wherein said difference between said modified reference voltage and said regulator output voltage multiplied times said gain factor is limited to a value between a maximum positive value and a maximum negative value.

5. The power supply of claim 2, wherein said compensated reference circuitry comprises a reference amplifier having an input coupled to said reference input voltage and an amplifier output coupled to said reference output, said amplifier output generating said reference input voltage multiplied by said gain factor.

6. The power supply of claim 2, wherein said compensated reference circuitry comprises:
    a reference amplifier having an input coupled to said reference input voltage and an amplifier output generating said reference input voltage multiplied by said gain factor; and
    a digital to analog converter (DAC) having a DAC reference input coupled to said amplifier output, a plurality of digital input signals, and a DAC output coupled to said reference output.

7. The power supply of claim 1, wherein a pulse width of said ON-time voltage pulse is generated in response to comparing said compensated reference to said regulated output voltage.

8. The power supply of claim 1, wherein said difference between said modified reference voltage and said regulator output voltage multiplied times said gain factor is limited to a value between a maximum positive value and a maximum negative value.

9. The power supply of claim 1, wherein said compensated reference circuitry comprises:
    a reference amplifier having an input coupled to said reference input voltage and an amplifier output coupled to said reference output, said amplifier output generating said reference input voltage multiplied by said gain factor;
    a voltage to current converter having an input coupled to said amplifier output and a current output generating a current proportional to said reference input voltage multiplied by said gain factor; and
    a resistor having a first terminal coupled to said first ground potential and a second terminal coupled to said current output and said reference output, wherein said modified reference is generated relative to said first ground potential.

10. The power supply of claim 9, further comprising a capacitor coupled across said resistor.

11. The power supply of claim 1, wherein said compensated reference circuitry comprises:
    a reference amplifier having an input coupled to said reference input voltage and an amplifier output, said amplifier output generating said reference input voltage multiplied by said gain factor;
    a digital to analog converter (DAC) having a DAC reference input coupled to said amplifier output, a plurality of digital input signals, and a DAC output generating a DAC voltage proportional to said reference input voltage multiplied by said gain factor in response to logic states of said digital input signals;
    a voltage to current converter having an input coupled to said DAC output and a current output generating a current proportional to said DAC voltage; and
    a resistor having a first terminal coupled to said first ground potential and a second terminal coupled to said current output and said reference output, wherein said modified reference is generated relative to said first ground potential.

12. The power supply of claim 11, further comprising a capacitor coupled across said resistor.

13. The power supply of claim 1, wherein said compensated reference circuitry comprises;
   transconductance amplifier having a gain Gm, a positive input coupled to said modified reference voltage, a negative input coupled to said regulator output voltage, and slew current output generating a slew current proportional to a difference between said modified reference voltage and said regulator output voltage times said gain Gm; and
   a capacitor having a capacitance Cm, a first terminal coupled to said second ground potential and a second terminal coupled to said slew current output, wherein a voltage across said capacitor generates said compensated reference voltage and said gain factor is said gain Gm times said capacitance Cm.

14. A system comprising:
   a processor referenced to a first ground potential;
   a memory for storing instructions and data for said processor;
   a power supply having a buck regulator coupled to a regulator input voltage and generating a regulated output voltage coupled to said processor in response to an ON-time voltage pulse wherein said ON-time voltage pulse has a first logic state when said regulated output voltage supplies energy to said processor directly from said regulator input and a second logic state when said regulated output voltage is supplying energy stored from said regulator input voltage;
   a controller for generating said ON-time voltage pulse in response to said regulator input voltage, said regulated output voltage, and a compensated reference voltage;
   a reference circuit having a reference output generating a modified reference voltage relative to said first ground potential in response to a reference input voltage generated relative to a second ground potential; and
   compensated reference circuitry for generating said compensated reference voltage as a time integral of a difference between said modified reference voltage and said regulator output voltage multiplied times a gain factor.

15. The system of claim 14, wherein said first and second ground potentials are equal potentials.

16. The system of claim 15, wherein a pulse width of said ON-time voltage pulse is generated in response to comparing said compensated reference to said regulated output voltage.

17. The system of claim 15, wherein said difference between said modified reference voltage and said regulator output voltage multiplied times said gain factor is limited to a value between a maximum positive value and a maximum negative value.

18. The system of claim 15, wherein said compensated reference circuitry comprises a reference amplifier having an input coupled to said reference input voltage and an amplifier output coupled to said reference output, said amplifier output generating said reference input voltage multiplied by said gain factor.

19. The system of claim 15, wherein said compensated reference circuitry comprises:
   a reference amplifier having an input coupled to said reference input voltage and an amplifier output generating said reference input voltage multiplied by said gain factor; and
   a digital to analog converter (DAC) having a DAC reference input coupled to said amplifier output, a plurality of digital input signals, and a DAC output coupled to said reference output.

20. The system of claim 14, wherein a pulse width of said ON-time voltage pulse is generated in response to comparing said compensated reference to said regulated output voltage.

21. The system of claim 14, wherein said difference between said modified reference voltage and said regulator output voltage multiplied times said gain factor is limited to a value between a maximum positive value and a maximum negative value.

22. The system of claim 14, wherein said compensated reference circuitry comprises:
   a reference amplifier having an input coupled to said reference input voltage and an amplifier output coupled to said reference output, said amplifier output generating said reference input voltage multiplied by said gain factor;
   a voltage to current converter having an input coupled to said amplifier output and a current output generating a current proportional to said reference input voltage multiplied by said gain factor; and
   a resistor having a first terminal coupled to said first ground potential and a second terminal coupled to said current output and said reference output, wherein said modified reference is generated relative to said first ground potential.

23. The system of claim 22, further comprising a capacitor coupled across said resistor.

24. The system of claim 14, wherein said compensated reference circuitry comprises:
   a reference amplifier having an input coupled to said reference input voltage and an amplifier output, said amplifier output generating said reference input voltage multiplied by said gain factor;
   a digital to analog converter (DAC) having a DAC reference input coupled to said amplifier output, a plurality of digital input signals, and a DAC output generating a DAC voltage proportional to said reference input voltage multiplied by said gain factor in response to logic states of said digital input signals;
   a voltage to current converter having an input coupled to said DAC output and a current output generating a current proportional to said DAC voltage; and
   a resistor having a first terminal coupled to said first ground potential and a second terminal coupled to said current output and said reference output, wherein said modified reference is generated relative to said first ground potential.

25. The system of claim 24, further comprising a capacitor coupled across said resistor.

26. The system of claim 14, wherein said compensated reference circuitry comprises;
   transconductance amplifier having a gain Gm, a positive input coupled to said modified reference voltage, a negative input coupled to said regulator output voltage, and slew current output generating a slew current proportional to a difference between said modified reference voltage and said regulator output voltage times said gain Gm; and
   a capacitor having a capacitance Cm, a first terminal coupled to said second ground potential and a second terminal coupled to said slew current output, wherein a voltage across said capacitor generates said compensated reference voltage and said gain factor is said gain Gm times said capacitance Cm.

* * * * *